United States Patent [19]

Pertzsch et al.

[11] 4,336,278
[45] Jun. 22, 1982

[54] METHOD FOR COATING MAGNETIC, BINDER-CONTAINING DISPERSIONS ON FLEXIBLE SUBSTRATES

[75] Inventors: Albert Pertzsch, Munich; Siegfried Rieger, Groebenzell; Friedrich Ankenbrand, Neuried, all of Fed. Rep. of Germany

[73] Assignee: Agfa-Gevaert Aktiengesellschaft, Leverkusen, Fed. Rep. of Germany

[21] Appl. No.: 183,054

[22] Filed: Sep. 2, 1980

[30] Foreign Application Priority Data

Sep. 6, 1979 [DE] Fed. Rep. of Germany ....... 2936035

[51] Int. Cl.$^3$ .............................................. B05D 3/14
[52] U.S. Cl. ....................................... 427/47; 427/48; 427/128; 427/271

[58] Field of Search .................... 427/47, 48, 127–132, 427/271

[56] References Cited

U.S. PATENT DOCUMENTS 3,021,230  2/1962  Deriaud ............................... 427/48
3,734,771  5/1973  Fritzsche ............................. 427/47

Primary Examiner—Bernard D. Pianalto
Attorney, Agent, or Firm—Connolly and Hutz

[57] ABSTRACT

Elimination of beads created along the edge during coating magnetic binder containing dispersions on a flexible support by subjecting the coated dispersion to the stray field of a magnetic circuit consisting of permanent magnets and soft magnetic conductor elements, the central line of the gap of the magnetic circuit extending downstream the moving support at an angle up to 10° in the direction towards the border of the support.

3 Claims, 3 Drawing Figures

METHOD FOR COATING MAGNETIC, BINDER-CONTAINING DISPERSIONS ON FLEXIBLE SUBSTRATES

The invention relates to a method for coating a flexible substrate with magnetisable, binder-containing dispersions with simultaneous elimination of the thickening occurring at the border of the substrate.

To produce magnetic tapes, dispersions containing the binder-containing magnetic particles are applied to flexible substrate by screen printing, extrusion coating methods and similar coating techniques. The coating containing magnetic dispersions can be extended beyond the width of the substrate in order to prevent thickening of the coating at the borders of the film, caused by cohesive forces in the dispersions. In British Pat. Nos. 1.276.744 and 1.276.381, and in German Offenlegungsschrift No. 27 35 853 the width of the coating is equal to the width of the moving substrate doctor brushes being provided in the former case to prevent the formation of a thicker covering at the edges of the conducting rods. To prevent any contamination of the conveying rollers for the substrate and thus also disturbance in production, the coating of the magnetisable dispersions is generally adjusted in such a way that the width of the coating applied is somewhat smaller than the width of the substrate. The abovementioned thickening in the coating or beads at the border are formed in this case. This leads to plate-shaped rolls in winding of the dry web due to the elevation of the borders and to unclean edges in cutting of the web into narrow magnetic tapes. The former method of removing the beads on the tape using brushes and doctors demands very precise height adjustment of these elements and suitable cleaning thereof in each individual case.

An object of the present invention is to develop a more effective maintenance-free method for eliminating the thick points along the borders during the coating of magnetic, binder-containing dispersions onto flexible substrates.

According to the present invention there is provided a method of coating magnetic, binder-containing dispersions onto flexible substrates, comprising applying the dispersion onto the substrate in a width narrower than that of the substrate; exposing the magnetic dispersion to a stray magnetic field immediately after the application thereof onto the substrate, the stray magnetic field emanating from a magnetic circuit comprising a permanent magnet and soft magnetic conductor elements, the central line of the gap of the magnetic circuit lying parallel with the plane of the tape and extending from the casting border toward the edge of the substrate in the direction of travel at an angle of <90° with respect to the casting border.

Other details of the invention are described with reference to an embodiment shown in the accompanying drawings, wherein:

DETAILED DESCRIPTION OF THE DRAWING

Figure 1:
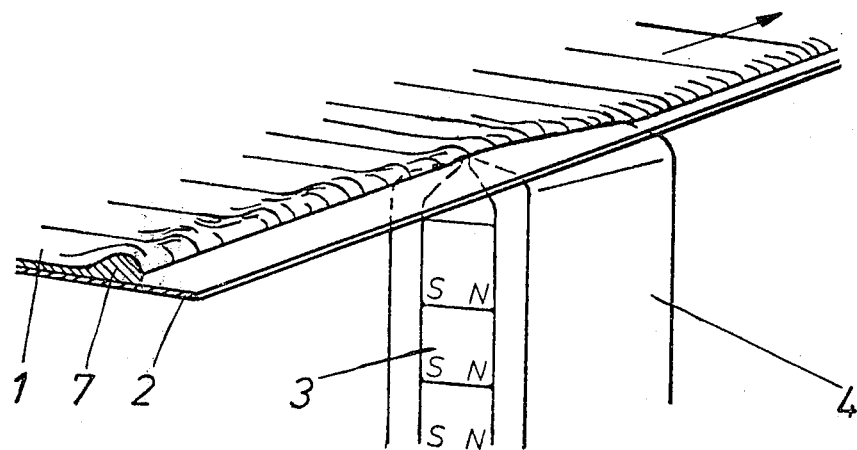
FIG. 1 shows a perspective view of the arrangement for eliminating the thickening along the borders.
Figure 2:
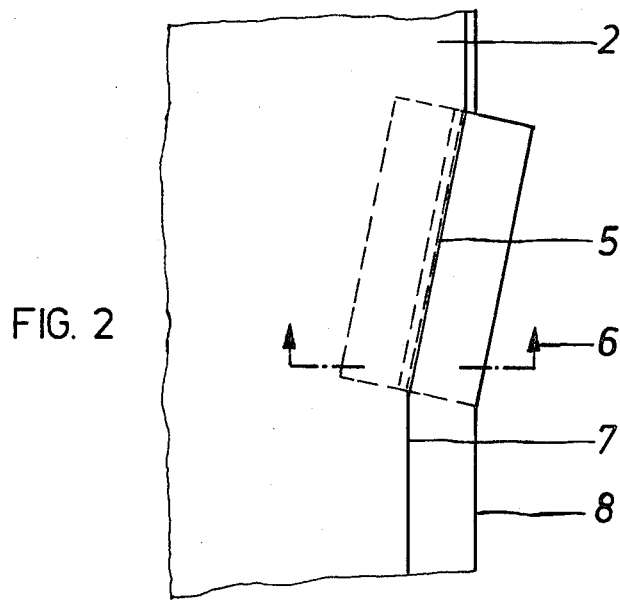
FIG. 2 shows a plan view of the arrangement of a permanent magnet and its conductor elements with respect to the direction of travel of the tape and FIG. 3 shows a cross-section of the course of a bead along the border using a magnetic circuit.
Figure 3:
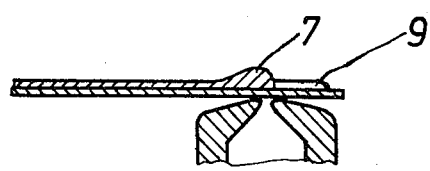

As shown in FIG. 1, a magnetic, binder-containing dispersion 1 is applied to a flexible substrate 2 generally composed of polyethylene terephthalate, with the aid of conventional casting devices, for example using extruders screen printing rollers or the like. Immediately downstream of the point of application of the casting, the dispersion is exposed to the stray field of a magnetic circuit so as to allow maximum mobility. The magnetic circuit consists of permanent magnets 3 with magnetic conductor elements 4 of high saturation magnetisation which supply an induced flux to the air gap as pole shoes and close the magnetic circuit. The permanent magnetic material consists of aluminium, nickel, cobalt alloys (Oerstit 400 K supplied by the company Thyssen Edelstahlwerke), of ferrites, for example Oxit 300 K or rare earth metal and cobalt, for example Oerstit 1500. Soft magnetic materials such as dynamo or transformer stampings are used for the conductor elements. The gap has a width up to 2 mm maximum while its length is from 10 to 200 mm. It is important to design the cross-section and the height of the conductor elements in such a way that the material is saturated at the edges of the gap. This is achieved with differing cross-sections depending on the magnetic materials used. The magnetic flux density in the range of influence of the magnetic dispersion amounts to between 500 and 1800 gauss, measured using the Yohogawa Gaussmeter of the 3251 type and an axial measuring probe. As also shown in FIGS. 1 and 2, the magnetic circuit is arranged beneath the substrate and the central line of the gap runs in the direction of travel 6 of the substrate between the border bead 7 of the dispersion applied and the edge of the substrate 8 at an angle of from 0,5 to 10°. If the substrate is guided through the stray magnetic field in the direction of travel 6, the extra-elevation of the border bead 7 disappears and the dispersion spreads to a normal coating thickness 9, as shown in FIG. 3.

With the aid of the method according to the invention, the bead which leads, in particular to problems during the cutting of individual magnetic tapes from a web of film, is eliminated with less financial outlay while ensuring the protection from explosion required on casting machines. The invention is not restricted to the specific embodiment but can also be applied to other embodiments for the magnetic circuit.

We claim:

1. The method of forming a coat of dispersions in a binder on a plane surface of a substrate, the coating composition comprising magnetizable dispersions in a binder containing the dispersions, the method steps including applying the composition of binder and magnetizable dispersions as a coat onto a plane surface of a flexible substrate and in a width narrower than that of the plane surface to provide a coat border spaced from the lateral edge of the substrate, subjecting the magnetizable dispersion to a strong magnetic field emanating from a magnetic circuit comprised of a pair of saturated pole elements having edges positioned to provide a gap therebetween and to supply an induced flux of a magnetic field at the gap, moving said coat and substrate together in a direction of travel past the pole elements with said plane surface moving in said direction of travel over the center line of the gap between the edges of the poles, and the substrate moving over the pole elements which are both positioned beneath the substrate with respect to the coat so that the center line of the gap forms an angle with the coat border of between 0.5 and 10°, and guiding the coat border through the induced flux of the magnetic field and moving the composition at the coat border toward the substrate lateral edge as the coat passes across the gap.

2. A method according to claim 1 wherein the flux density of the magnetic circuit is between 500 and 1800 gauss.

3. A method according to claim 1 wherein the gap length is in the range of from 10 to 200 mm with a gap width of 0,5 to 2 mm.

* * * * *